United States Patent
Sharp (10) Patent No.: US 9,033,135 B1
(45) Date of Patent: May 19, 2015

(54) BELT ALIGNMENT SYSTEM WITH DUAL ROLLERS

(71) Applicant: David Allen Sharp, Timmins (CA)

(72) Inventor: David Allen Sharp, Timmins (CA)

( * ) Notice: Subject to any disclaimer, the term of this patent is extended or adjusted under 35 U.S.C. 154(b) by 0 days.

(21) Appl. No.: 14/253,164

(22) Filed: Apr. 15, 2014

(51) Int. Cl.
*B65G 15/64* (2006.01)
*B65G 39/16* (2006.01)
*B65G 15/60* (2006.01)
*B65G 15/08* (2006.01)

(52) U.S. Cl.
CPC ............... *B65G 39/16* (2013.01); *B65G 15/64* (2013.01); *B65G 15/08* (2013.01); *B65G 15/60* (2013.01)

(58) Field of Classification Search
CPC ......... B65G 15/60; B65G 15/64; B65G 39/16
USPC ................................................ 198/806, 808
See application file for complete search history.

(56) References Cited

U.S. PATENT DOCUMENTS

| | | | |
|---|---|---|---|
| 2,132,052 A | 10/1938 | Sollenberger | |
| 2,132,053 A | 10/1938 | Sollenberger et al. | |
| 2,869,712 A * | 1/1959 | Kindig | 198/808 |
| 3,038,588 A | 6/1962 | Arndt et al. | |
| 3,056,578 A | 10/1962 | Auger | |
| 3,058,573 A | 10/1962 | Lo Presti | |
| 3,066,547 A | 12/1962 | Evans et al. | |
| 3,187,881 A | 6/1965 | Clark | |
| 3,368,665 A | 2/1968 | Jinkins | |
| 3,496,619 A | 2/1970 | Constant | |
| 3,593,841 A * | 7/1971 | Leow | 198/806 |
| 3,777,878 A | 12/1973 | Morrison | |
| 3,946,619 A | 3/1976 | Needles et al. | |
| 4,032,002 A * | 6/1977 | Jackson | 198/808 |
| 4,072,611 A | 2/1978 | Davis | |
| 4,092,914 A | 6/1978 | Burrough et al. | |
| 4,231,161 A | 11/1980 | Belfiore | |
| 4,527,440 A | 7/1985 | Heitman et al. | |
| 4,544,061 A | 10/1985 | Crandall | |
| 4,693,363 A | 9/1987 | Kuehnert | |
| 4,765,455 A | 8/1988 | Matsuno et al. | |
| 5,117,969 A | 6/1992 | Roth | |
| 6,131,726 A | 10/2000 | Hovsto et al. | |
| 6,520,717 B1 | 2/2003 | Otto et al. | |
| 6,634,490 B2 | 10/2003 | Fischer et al. | |
| 7,051,867 B2 | 5/2006 | Sharp | |
| 7,614,493 B2 * | 11/2009 | Dowling et al. | 198/806 |
| 8,376,127 B2 | 2/2013 | Sharp | |
| 8,800,755 B2 | 8/2014 | Sharp | |
| 2004/0079621 A1 | 4/2004 | Mott | |
| 2010/0006402 A1 * | 1/2010 | Sharp | 198/806 |
| 2011/0272250 A1 | 11/2011 | DeVries | |

FOREIGN PATENT DOCUMENTS

WO  WO 2005108250 A1 * 11/2005 ............. B65G 39/16

* cited by examiner

*Primary Examiner* — Mark A Deuble
(74) *Attorney, Agent, or Firm* — Greer, Burns & Crain, Ltd.

(57) ABSTRACT

An alignment system for a conveyor having a conveyor belt trained over rollers on a conveyor frame where the system includes a support bracket including a center support and pivoting members each including a torque arm, the pivoting members being pivotally mounted to opposing ends of the support bracket. Two tracking rollers are independently mounted to the support bracket, where each of the tracking rollers includes a shaft with an inner end and an outer end, the outer ends of the shafts being coupled to the pivoting members and the inner ends being coupled to the center support such that pivoting movement of the pivoting members causes the tracking rollers to pivot relative to the center support. A guide control bar having two ends is pivotally connected at each the end to a corresponding torque arm connected to the corresponding pivoting member, where the guide control bar includes guide rollers positioned at both edges of the conveyor belt for lateral control of the belt.

17 Claims, 10 Drawing Sheets

BELT ALIGNMENT SYSTEM WITH DUAL ROLLERS

BACKGROUND

The present invention relates to the operation of conveyor belts, such as those known as endless belts supported by a series of parallel support rollers, and more particularly to a system for maintaining alignment of a conveyor belt during operation.

Belt tracking is a problem in any industry that uses conveyor belts. It, is often not a major problem but rather a maintenance nuisance that progressively over time becomes a major cost.

Several factors can affect belt tracking. Misalignment of the rollers will cause corresponding belt tracking problems. Also, uneven loading of conveyor belts may also cause tracking problems, as well as unequal driving forces across the belt width.

Further, it is common for a tracking device for conveyor belts to fail prematurely. Carry back material (material that has not been removed by a belt scraper at the conveyor discharge point) for instance may cause material build up and result in the rollers and pivot mechanism to seize into a misalignment position.

Various conveyor belt systems have been developed over the years with design considerations relating to accurate tracking. Within any belt the ability to track will vary considerably, and this in turn is due to a number of variables involved in the production of a belt itself. Compounding this problem is the possibility that the belt might be stretched upon installation. Over correction during initial tracking adjustments may result in stretching the belt in inappropriate areas. It has also been observed that existing tracking devices will only align a conveyor belt once it is way off center, thereby resulting in serious damage and down time.

In U.S. Pat. No. 7,051,867, which is incorporated by reference, a suitable belt alignment system includes a pair of pivoting members, each mounted on a corresponding support bracket. Each pivoting member is configured for supporting one of a pair of tracking rollers at a corresponding tracking roller shaft end. Each shaft end is pivotally and non-rotatably attached to a corresponding pivoting member by a ball bushing mounted in a corresponding one of the pivoting members.

In U.S. Pat. No. 8,376,127, which is also incorporated by reference, a belt alignment system includes a pair of pivoting members, where each pivoting member is configured for supporting one of a pair of tracking rollers at a corresponding tracking roller shaft end. The shaft ends are each pivotally and non-rotatably attached to a corresponding pivoting member by a bushing mounted in a rotatable block in a corresponding one of the pivoting members.

In applications using a wide conveyor belt, the shaft including the tracking rollers that supports the belt must be equal to or wider than the belt to provide sufficient support for the belt. The added weight from the wider belt and any residual product or dirt remaining on the belt, increases the stress forces on the bushings at the shaft ends, which increases the wear on the bushings and the risk of malfunction or failure. Also in conveyor systems including cupped or v-shaped conveyor belts, belt alignment systems having a single shaft only provide support at the central portion of the belts that contact the rollers. As a result, the force from the weight of the belt is greatest at the center of the shaft between the bushings which can lead to bending or failure of the shaft.

SUMMARY

The present belt alignment system addresses the disadvantages of the prior art by providing an improved system featuring multiple angled tracking rollers that generally conform to angled or cupped conveyor belts and provide additional support to conveyor belts traversing relative wide spans.

In an embodiment, an alignment system for a conveyor having a conveyor belt trained over rollers on a conveyor frame is provided where the system includes a support bracket including a center support and pivoting members each including a torque arm, the pivoting members being pivotally mounted to opposing ends of the support bracket. Two tracking rollers are independently mounted to the support bracket, where each of the tracking rollers includes a shaft with an inner end and an outer end, the outer ends of the shafts being coupled to the pivoting members and the inner ends being coupled to the center support such that pivoting movement of the pivoting members causes the tracking rollers to pivot relative to the center support. A guide control bar having two ends is pivotally connected at each the end to a corresponding torque arm connected to the corresponding pivoting member, where the guide control bar includes guide rollers positioned at both edges of the conveyor belt for lateral control of the belt.

In another embodiment, an alignment system for a conveyor having a conveyor belt trained over rollers on a conveyor frame is provided where the system includes an adjustable support bracket including a center support such that a position of the support bracket is adjustable relative to the conveyor frame. The system also includes pivoting members pivotally mounted to opposing ends of the support bracket and two tracking rollers independently mounted to the support bracket, where each of the tracking rollers includes a shaft coupled to one of the pivoting members and pivotally connected to the center support and each of the tracking rollers forms an angle relative to a horizontal line. A guide control bar has two ends and is pivotally connected at each the end to one of the pivoting members, where the guide control bar includes guide rollers positioned at both edges of the conveyor belt for lateral control of the belt.

DETAILED DESCRIPTION

Figure 1:
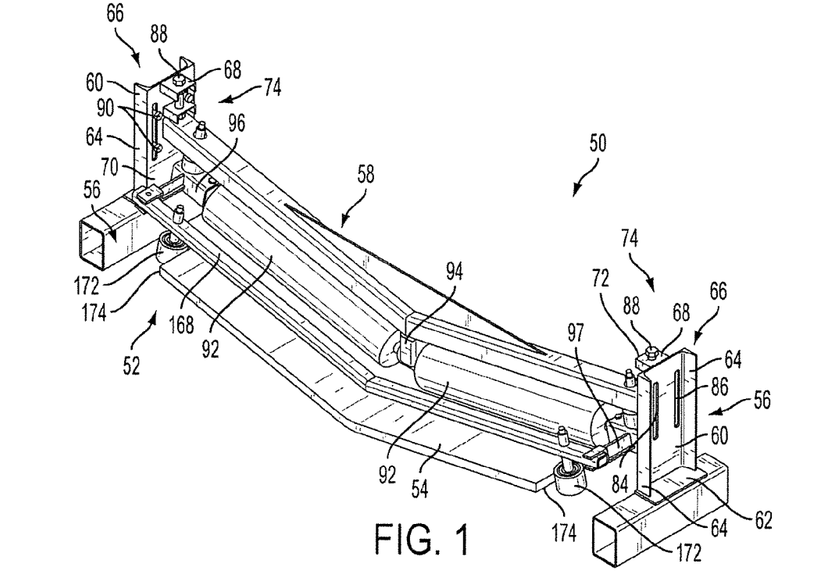
FIG. 1 is a perspective view of an embodiment of the present belt alignment system with a conveyor belt.
Figure 2:
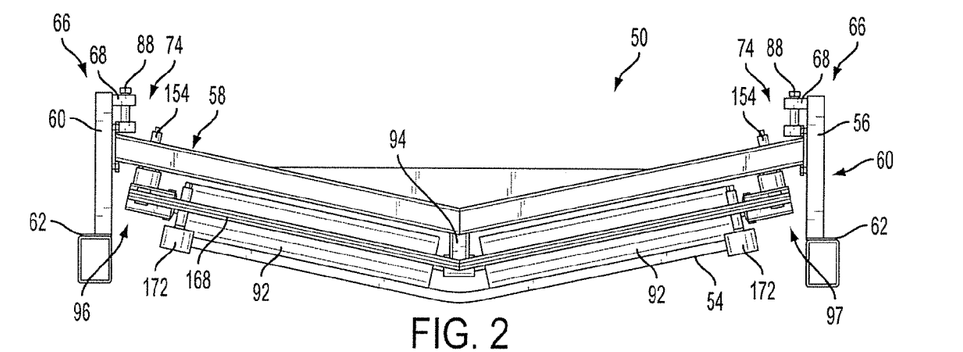
FIG. 2 is a front view of the belt alignment system of FIG. 1.

Referring to FIGS. 1 and 2, the present conveyor belt alignment system, generally designated 50, is intended for use in combination with a conveyor, generally designated 52, of the type having an elongated flexible endless belt 54 trained over a head roller and a tail roller (not shown), the head roller being rotatably powered by a conveyor drive. A typical conveyor 52 will include a relatively rigid conveyor frame 56 holding the rollers at a designated angle relative to the frame where tracking rollers are configured in a v-shaped orientation for rotation about respective angled rotational axes. The conveyor belt 54 is trained about the head and tail rollers and has a working or troughing v-shaped flight and a v-shaped return flight. It is noted that the width and length of the belt 54 may vary. Also, it is contemplated that the belt 54 may be planar or flat as described below, as well as angled or cupped to retain particulate matter or other materials or products, particularly on the troughing flight.

As shown in FIGS. 1-9, the belt alignment system 50 is movably mounted to the conveyor frame 56 by a v-shaped support bracket 58 extending between vertically oriented mounting brackets 60 to enable the vertical position of the support bracket to be adjusted relative to the frame. Each of the mounting brackets 60 has a bottom flange 62 mounted to the conveyor frame 56 by welding, fasteners or other suitable connectors or connection methods. The mounting brackets 60 also include elongated support flanges 64 extending from the bottom flange 62 to a top end 66 of the brackets. To secure the mounting brackets to the support bracket 58, a top flange 68 extends outwardly from the top end 66 and on an opposing side 70 of each mounting bracket 60 from the bottom flange 62. The top flanges 62 define holes 72 that align with corresponding holes on the v-shaped support bracket 58.

As shown in the illustrated embodiment, each end 74 of the support bracket 58 includes a plate 76 (FIGS. 4 and 7) including four holes 78 and a corresponding flange 80 including a hole 82. On each end 74, a first pair of the holes 78 on the respective plate 76 align with a first elongated slot 84 on a corresponding mounting bracket 60 and a second pair of the holes 78 align with a second elongated slot 86. Also the hole 82 in the flange 80 on each end 74 of the support bracket 58 is aligned with the corresponding hole 72 in the top flange 68 of the respective mounting bracket 60. A fastener, such as a threaded bolt 88, is inserted through the holes 72 and 82 in the top flange 68 and the flange 80 and secured by a nut. To adjust the height or position of the support bracket 58 relative to the mounting brackets 60 and thereby the conveyor frame 56, the bolts 88 are each rotated in a clockwise direction which threads the bolts further into the nuts and causes the support bracket 58 to move upwardly relative to the mounting brackets 60. Conversely, the support bracket 58 is lowered relative to the mounting brackets 60 by rotating or turning the bolts 88 in a counter-clockwise direction. Once the position of the support bracket 58 is set, fasteners, such as screws or bolts 90 (FIG. 1), are inserted into each of the four holes 78 in the plates 76 on each end of the bracket 58 and through the elongated first and second slots 84, 86 and secured by nuts to secure each end of the support bracket 58 in position relative to the mounting brackets 60 and conveyor frame 56. The adjustment of the position of the support bracket, and thereby the belt alignment system, is needed to accommodate to different conveyor belt systems where the height and/or the position of the conveyor belt varies. Alternatively, the support bracket 58, and thereby the belt alignment system, may be fixed to the conveyor frame 56 at a designated position.

Figure 10:
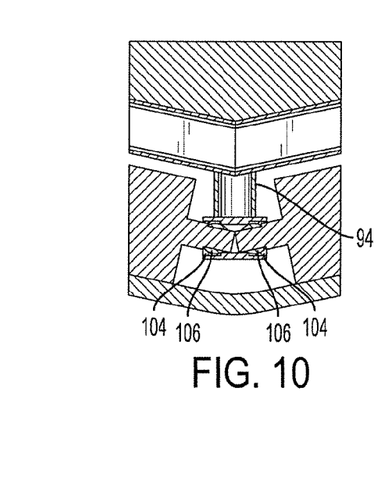
FIG. 10 is a fragmentary cross-section view of a center support taken substantially along line 10-10 in FIG. 3.
Figure 24:
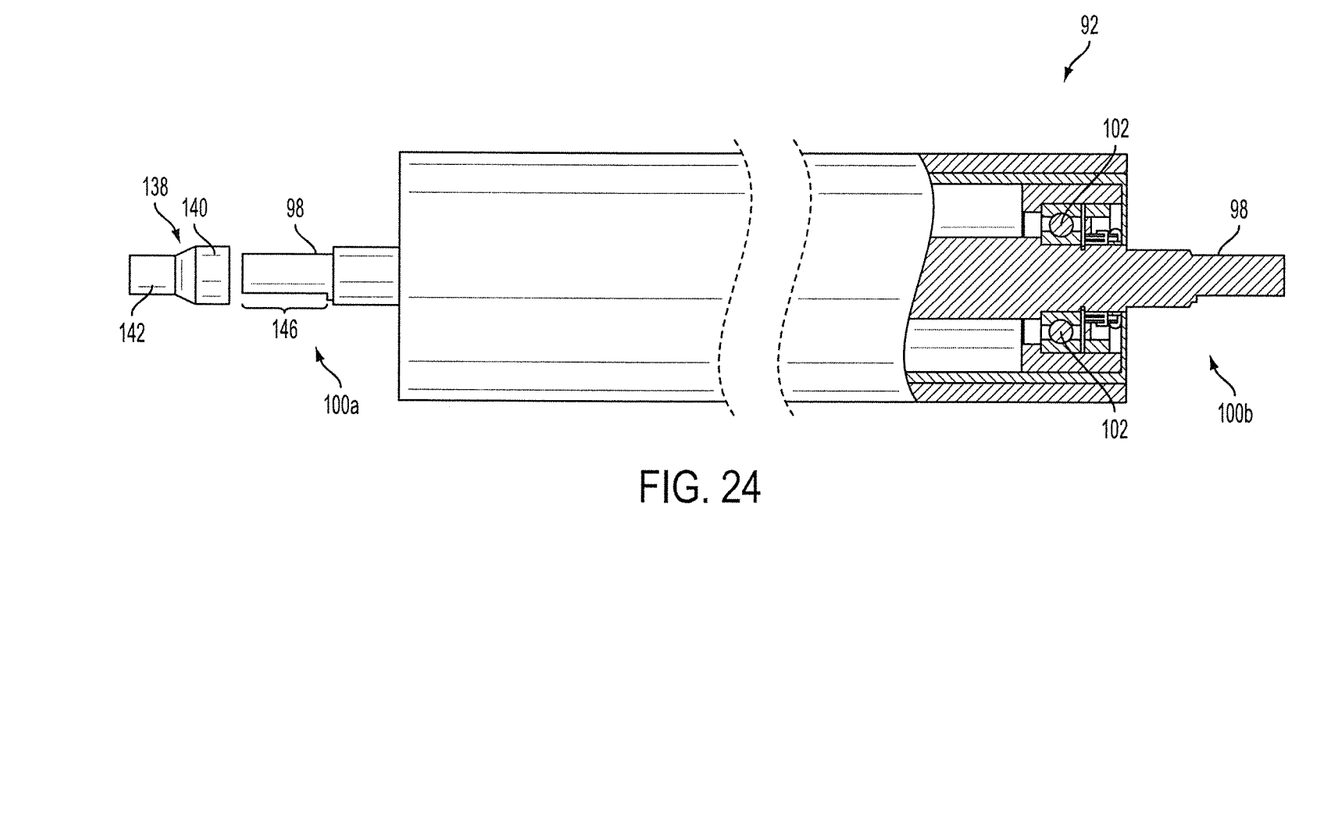
FIG. 24 is a fragmentary cross-section view of a tracking roller of the belt alignment system of FIG. 1.
Figure 25A:
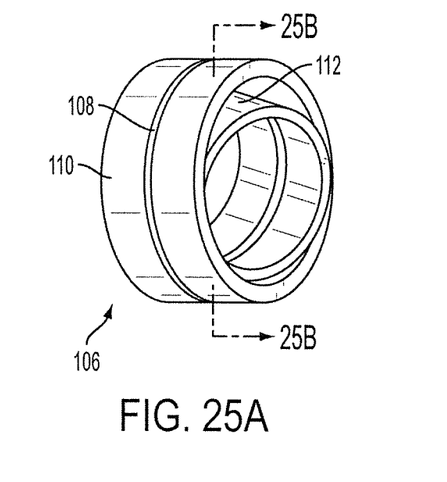
FIG. 25A is a perspective view of a spherical bushing of the belt alignment system of FIG. 1.
Figure 25B:
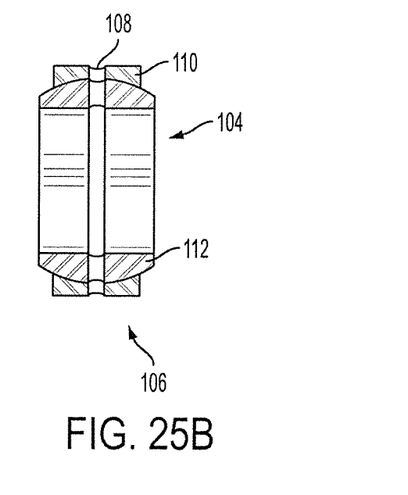
FIG. 25B is a cross-section view of the spherical bushing taken substantially along line 25B-25B in FIG. 25A.

Referring to FIGS. 1 and 10-25B, two tracking rollers 92 are independently mounted on the support bracket 58 between a center support 94 and a pivoting member 96, 97. Providing multiple tracking rollers each being supported at an inner and an outer end by bearings, distributes the weight of the rollers and the belt over the bearing points thereby lessening the stress forces on the alignment system. This is particularly critical when the present belt alignment system is used on conveyor systems having relatively wide belts and/or belts carrying heavy materials. As shown in FIG. 24, the tracking rollers 92 each include a shaft 98 having opposing ends, namely outer ends 100a and inner ends 100b, where the shafts each remain stationary and the tracking rollers rotate relative to the shafts via bearings 102. The inner shaft ends 100b are inserted into corresponding openings 104 in the center support and through spherical bushings 106 (FIGS. 10, 25A and 25B). The spherical bushings 106 are secured in the center support 94 by a snap-fit such as by fitting an annular protrusion (not shown) on an inner surface of the center support into an annular groove 108 on the bushing, a friction fit or other suitable connection method. Each spherical bushing 106 includes a stationary ring 110 and a bushing member 112 that is pivotally and rotatably attached to the ring. As described above, the inner shaft ends 100b are inserted through the corresponding bushing members 112 to enable each of the inner shaft ends to pivot relative to the center support. It should be noted that the shaft 98 need not extend continuously through the corresponding tracking roller 92 but may be provided in shaft segments, that the rollers 92 could also be metal such as steel, lagged rollers or rollers made out of rubber, urethane, castellated rubber or any suitable material or combination of materials.

Figure 11:
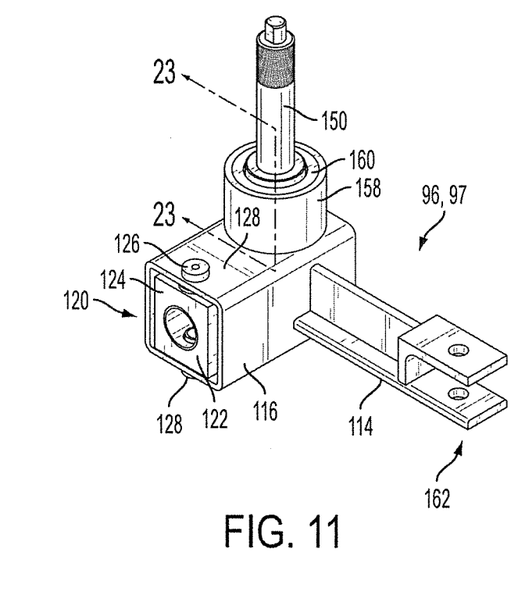
FIG. 11 is a perspective view of a pivoting member of the present belt alignment system of FIG. 1.
Figure 12:
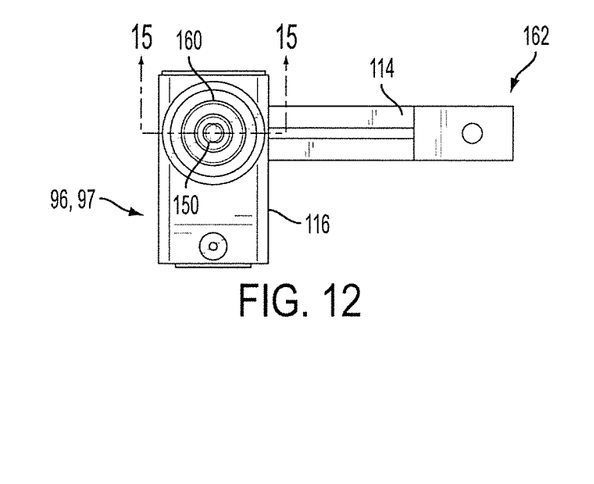
FIG. 12 is a top view of the pivoting member of FIG. 11.
Figure 13:
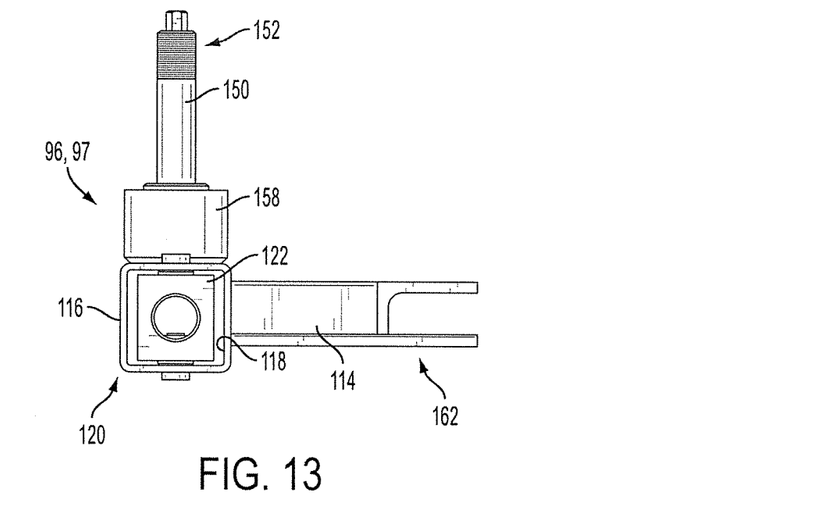
FIG. 13 is a front view of the pivoting member of FIG. 11.

The opposing, outer shaft ends 100a are secured to pivoting members 96, 97 to enable the outer shaft ends, and thereby the tracking rollers 92, to pivot relative to the support bracket 58. The pivoting members 96, 97 are preferably mounted to the v-shaped support bracket 58 on either the working flight side or the return flight side of the conveyor belt 54. As shown in FIG. 11, each pivoting member 96, 97 is generally L-shaped, including a torque arm 114 fixed normally adjacent to an end of a bushing housing 116. Each torque arm 114 is located laterally outside of the conveyor belt 54 and is connected to a corresponding pivoting member 96, 97. The bushing housing 116 is preferably polygonal and the shape may vary, but in the preferred embodiment, is square in cross-section (FIGS. 11 and 15), and defines a bushing chamber 118. While other materials are contemplated, the preferred bushing housing 116 is three-inch square HSS tubing. It is contemplated that the size of the tubing will vary with the size of the belt 54. An open end 120 of the bushing chamber 118 located opposite the torque arm 114 forms a location for a rotating bushing 122.

In the illustrated embodiment, the rotating bushing 122 includes a block 124 dimensioned to be freely rotatable about a vertical axis defined by pivot pins 126, 128 (FIGS. 20, 21) engaged in upper and lower walls 128, 130 of the bushing housing 116. The block 124 includes a central bore 134 provided with a circular bushing member 136. In the preferred embodiment, the central bore 134 of the bushing member 136 is configured for individually, pivotally and non-rotatably accommodating at least one of the roller shaft ends 100a or an optional shaft adapter. As is known in the art, the shaft adapter 138 (FIG. 24) has a shaft engagement end 140 for receiving the shaft end 100a, and an opposite end 142 having the same dimensions as the outer shaft end 100a for engaging the rotating bushing 122.

Figure 21:
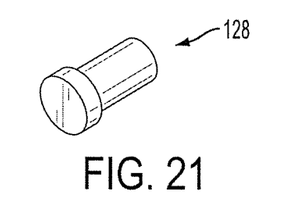
FIG. 21 is a perspective view of a second pivot pin of the rotating bushing of FIG. 16.
Figure 22:
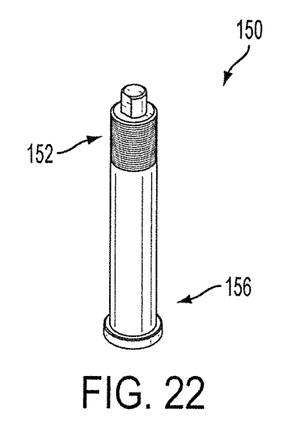
FIG. 22 is a perspective view of a pivot pin of the pivoting member of FIG. 11.
Figure 23:
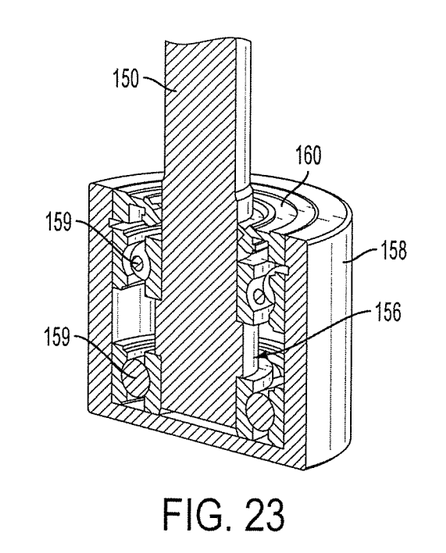
FIG. 23 is a fragmentary cross-section view of the pivot housing and pivot pin taken substantially along line 23-23 of the pivoting member of FIG. 11.

It is preferred that the bushing member 136 is an Oil Lite bushing, with an opening 144 at least one end for receiving one of the pivot pins 126 or 128, which are hollow and are each preferably provided with a lubricating fitting, such as the conventional Zerk fitting. As such, lubricant such as oil or grease may be injected into the fitting for lubricating the bushing member 136 and the shaft end 100a. In the preferred embodiment, both pins 126, 128 are provided with lubricating fittings. Also, as seen in FIGS. 20A and 21, one of the pivot pins, namely pivot pin 128, has a longer length than pivot pin 126 so that it extends transversely through the block 124 and the bushing member 136 for engaging a flat spot 146 (FIG. 24) on the shaft end 100a for preventing rotation of the shaft end relative to the bushing member 136. However, the shaft end 100b still pivots with the block 124 relative to the bushing housing 116 about a pivot axis defined by the pins 126, 128.

The pivot pins 126, 128 are each preferably provided with a tubular pin bushing 148 (FIG. 19) for facilitating the rotation of the block 124 relative to the bushing housing 116. While the material may vary to suit the situation, the pin bushing 148 is preferably made of the same Oil Lite material as is the bushing member 136. Thus, upon assembly and proper lubrication, the present rotating bushing 122 readily accommodates the full degree of deflection of the shaft 98 having the tracking rollers 92 and the shaft ends 100b to maintain desired belt alignment as will be described below.

Figure 14:
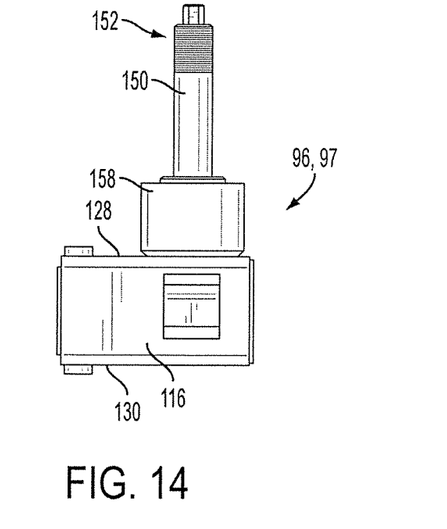
FIG. 14 is a side view of the pivoting member of FIG. 11.
Figure 15:
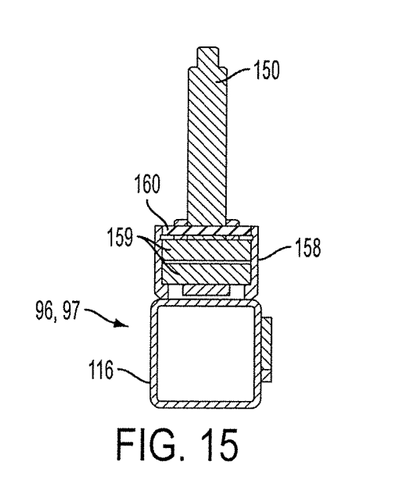
FIG. 15 is a cross-section view of the pivoting member taken substantially along line 15-15 in FIG. 12.
Figure 16:
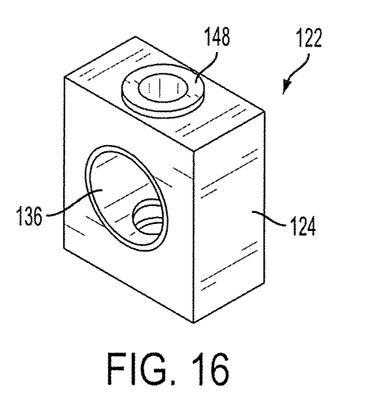
FIG. 16 is a perspective view of a rotating bushing of the belt alignment system of FIG. 1.
Figure 17:
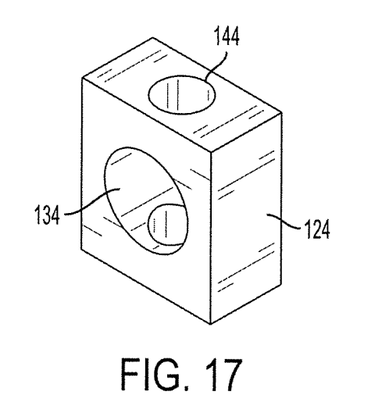
FIG. 17 is a perspective view of the housing of the rotating bushing of FIG. 16.
Figure 18:
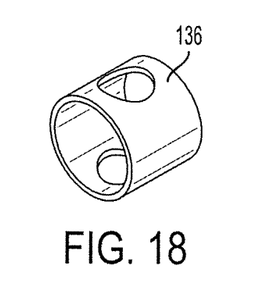
FIG. 18 is a perspective view of a sleeve of the rotating bushing of FIG. 16.
Figure 19:
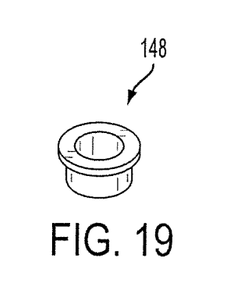
FIG. 19 is a perspective view of a pin sleeve of the rotating bushing of FIG. 16.
Figure 20:
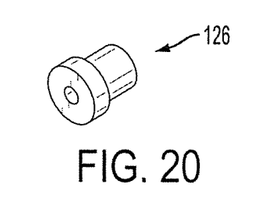
FIG. 20 is a perspective view of a first pivot pin of the rotating bushing of FIG. 16.

Each of the pivoting members 96, 97 is attached or mounted to the support bracket 58 by a mounting pin 150 (FIG. 22) that extends through a respective through-hole 151 (FIGS. 5 and 9) in the support bracket where an end 152 of the mounting pin including threads is secured to the support bracket 58 by a suitable fastener such as at least one of a washer and/or a nut 154 (FIG. 2). An opposing end 156 of the mounting pin 150 is rotatably mounted in a pivot housing 158 integrally formed with or attached to the bushing housing 116 as shown in FIGS. 11 and 14. Specifically, the end 156 of the mounting pin 150 is provided with a pair of bearings 159 (FIG. 23) for facilitating relative rotation of the pivot housing 158 and the bushing housing 116 relative to the support bracket 58. The interior of the pivot housing 158 is sealed by a cover member 160.

Figure 26:
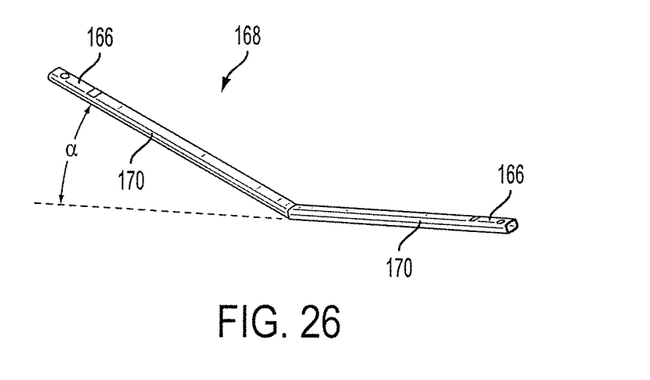
FIG. 26 is a perspective view of a guide control bar of the belt alignment system of FIG. 1.

Returning now to FIGS. 1 and 26, a free end 162 of each torque arm 114 opposite the bushing housing 116 has a clevis and is pivotally attached at a pivot point such as a bolt 164 to a corresponding end 166 of a cross-link member or guide control bar 168 having ends extending laterally past or outside the conveyor belt 54. In the illustrated embodiment, the guide control bar 168 has two arms 170 configured as a designated angle α forming a v-shape to match a shape of the belt 54 and the support bracket 58 as well as the configuration of the tracking rollers 92. In the illustrated embodiment, the angle α is the angle between each of the arms 170 and a horizontal line or horizontal axis. It should be appreciated that the guide control bar 168 may be straight as discussed below or any suitable shape or the arms may be at any suitable angle or combination of angles. Attached to the guide control bar 168 are two spaced, freely rotating guide rollers 172 (FIGS. 1 and 2) positioned for periodically engaging corresponding edges 174 of the conveyor belt 54.

The guide or tracking control bar 168 activates the pivoting mechanism provided by the pivoting members 96, 97 through the torque arms 116. Unlike tracking rollers 92 used in combination with conventional conveyor belt applications, the present alignment system 50 provides for the conveyor belt 54 crossing tracking rollers 92 before the belt reaches the guide rollers 172, thereby ensuring that the guide rollers adjust the correct belt path rather than the mistracking path. In this regard, when the conveyor belt 54 contacts one of the guide rollers 172, the respective pivoting member 96, 97 pivots, which in turn, causes an end 100a of the respective tracking roller to pivot in a first direction and the end 100a of the opposing tracking roller to pivot in an opposite direction. The pivoting of the tracking rollers 92 relative to the center support 94 helps to steer or guide the conveyor belt 54 so that the belt is generally centered or aligned on the frame 56. Thus, the ends 100a of the shafts pivot in unison with the pivoting movement of the guide rollers 172 by an amount equal to the amount that the guide rollers move on the frame.

Figure 3:
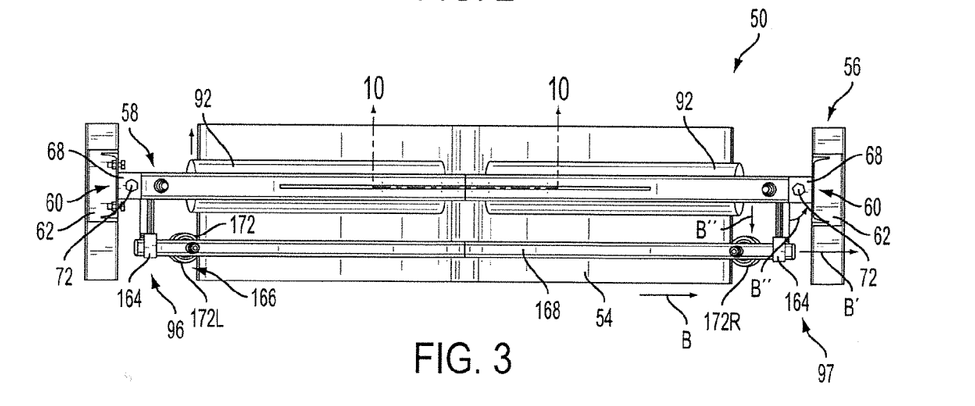
FIG. 3 is a top view of the belt alignment system of FIG. 1.
Figure 4:
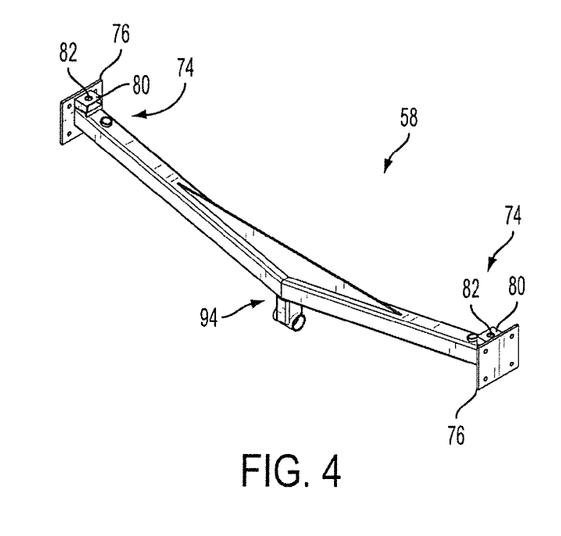
FIG. 4 is a perspective view of a support member of the belt alignment system of FIG. 1.
Figure 5:
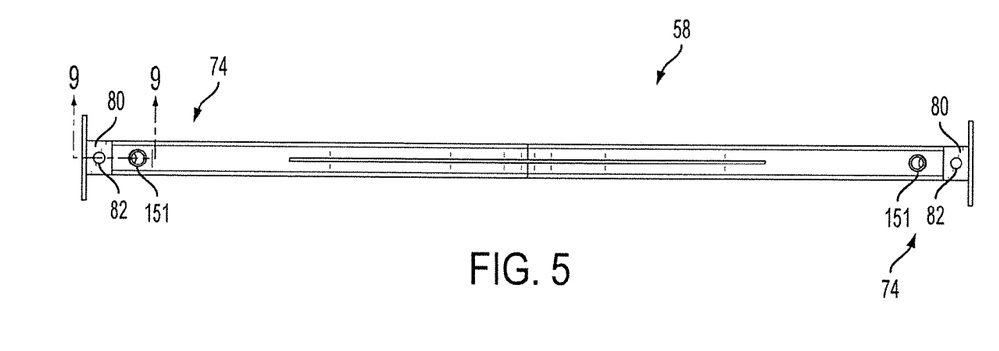
FIG. 5 is a top view of the support member of FIG. 4.
Figure 6:
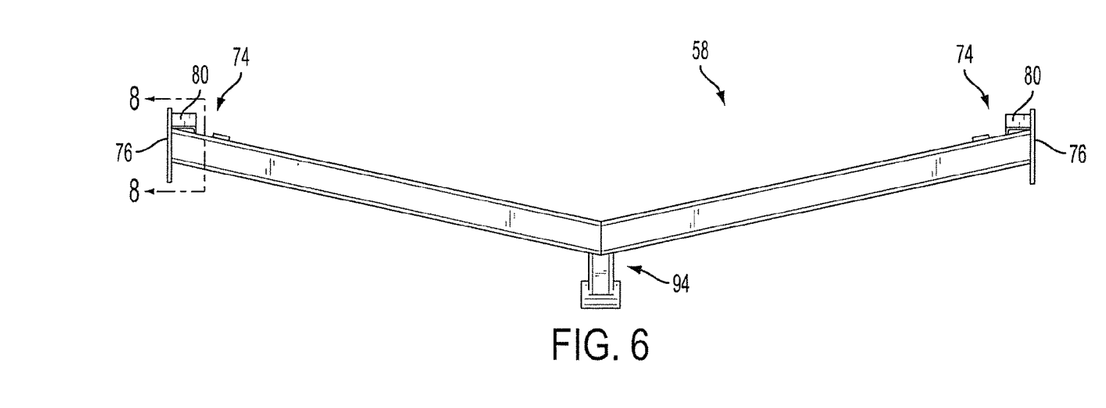
FIG. 6 is a front view of the support member of FIG. 4.
Figure 7:
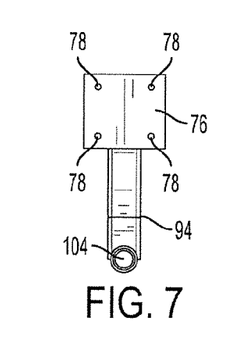
FIG. 7 is a side view of the support member of FIG. 4.
Figure 8:
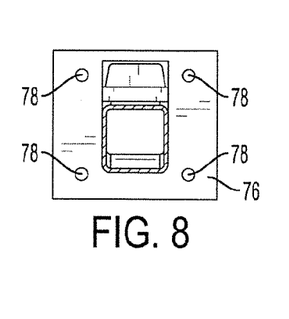
FIG. 8 is a cross-section view of the support member taken substantially along line 8-8 in FIG. 6.
Figure 9:
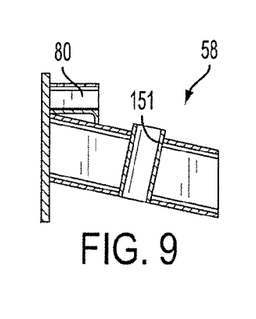
FIG. 9 is a fragmentary cross-section view of the support member taken substantially along line 9-9 in FIG. 5.

In operation, as the belt 54 travels along the conveyor 52, the guide rollers 172 generally follow the lateral movement of the belt, thereby continuously monitoring and controlling the belt alignment and axis. It is contemplated that when the belt 54 is properly aligned, the guide rollers 172 may not be engaged by the belt edges 174. As the belt 54 drifts in one lateral direction, for example the right as seen at the arrow B in FIG. 3, the right guide roller 172R will begin to rotate and also move right on the guide control bar 168, seen by the arrow B', causing the adjacent pivoting member 97 to rotate clockwise as seen in FIG. 3 about its pivot axis defined by a mounting pin 150 as shown by arrow B". The mounting pin 150 is provided with a bearing 176 for facilitating relative rotation of the pivot housing 158 connected to the bushing housing 116. Thus, the pivot housing 158 and the bushing housing 116 move together. The guide control bar 168 is thus connected at each end to the respective shaft end 100a through three pivot points, 42, 76 and 66.

This movement causes the bushing housing 116 to also rotate clockwise, causing the corresponding shaft end 100b to move forward at arrow B''' as seen in FIG. 3. As the shaft end 100b moves forward due to the rotation of the corresponding pivoting member 97, the opposing, inner shaft end 100a of the tracking roller acts as a pivot point and pivots relative to the center support 94 via the spherical bushing 106. Such shaft deflection at end 100b will be accommodated by the bushing 122 in the opposite pivoting member 96, which will accommodate the movement of the opposite shaft end 100b in the opposite direction (rearward as seen in FIG. 3) pivoting about shaft end 100a in center support 94. In addition, this deflection of the shaft end 100b, and the subsequent angled orientation of the tracking rollers 92, will cause the belt 54 to move back to its desired centered or centrally aligned position. As the belt 54 moves back to the centered position, the opposite edge 176 may eventually engage the opposite guide roller 172L.

Figure 27:
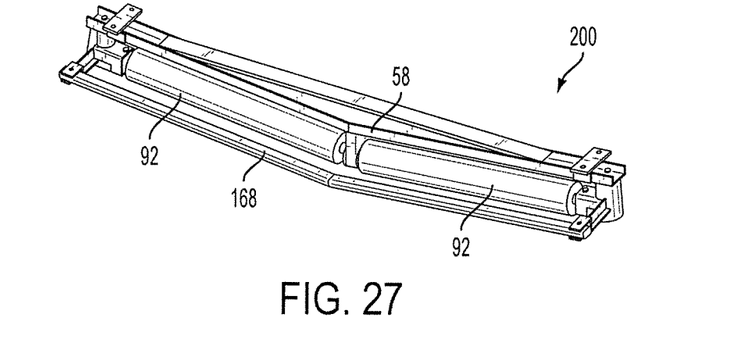
FIG. 27 is a perspective view of another embodiment of the present belt alignment system.

Referring now to FIG. 27, another embodiment of the present belt alignment system is generally designated 200 where each of the tracking rollers 92, the support bracket 58 and/or the guide control bar 168 are configured to have a 12 degree angle relative to a longitudinal or horizontal axis or horizontal line extending through the alignment system. It should be appreciated that at least one of the tracking rollers, support bracket and the guide control bar can be configured to have an angle α between 0 to 45 degrees, and preferably, 10 to 30 degrees relative to the horizontal line. In this regard, the shape or angle of the tracking rollers, the support bracket and the guide control bar depend at least in part on the shape or angle of the conveyor belt being aligned by the present belt alignment system.

Figure 28:
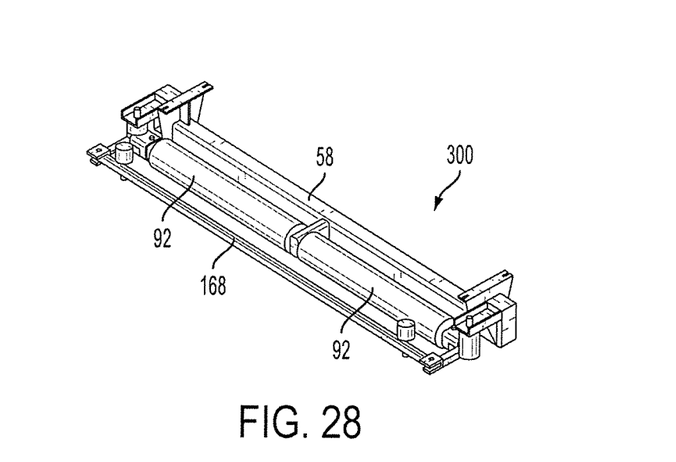
FIG. 28 is a perspective view of a further embodiment of the present belt alignment system.

Referring now to FIG. 28, a further embodiment of the present belt alignment system 300 is illustrated where the tracking rollers 92, the support bracket 58 and the guide control bar 168 are straight or form a 0 degree angle relative to the horizontal line passing through the alignment system. The straight configuration of the tracking rollers and the guide control bar are used in conveyor systems where the conveyor belt is generally flat or has a nominal v-shape or cup shape relative to the horizontal line.

The present conveyor alignment system described in the above embodiments is configured to match the configuration of the return rollers on the conveyor whether the rollers are straight (0 degree angle) or at a designated angle (i.e., vee return rollers) thereby making the installation of the alignment system easier. Sometimes in conventional conveyor systems, flat return tracking rollers are installed on a conveyor belt having vee return rollers such that the vee return rollers must be removed and replaced with flat or straight return rollers before and after the flat return tracking rollers to ensure a smooth transition before and after the return tracking rollers. Although feasible, the replacement of the vee return rollers involved substantial time, labor and costs as well as increased the down time of the conveyor system. The present belt alignment system is adjustable such that the rollers may be flat/straight rollers or angled rollers thereby eliminating the above replacement time and costs.

Also, the dual rollers of the present belt alignment system help to distribute the load or forces on the alignment system from the weight and movement of the conveyor belt. As tensions, belt speeds, weight and widths of conveyor belts increase, the tracking roller supporting and guiding the conveyor belt must be stronger and more dependable. Using the dual rollers of the present belt alignment system, the shaft deflection and bearing loads are reduced over conventional single roller/shaft tracking systems because the present system distributes the load/force over four bearings instead of two bearings. The dual roller construction of the present system is also lighter in weight and thereby easier to install on a conveyor system.

The present belt alignment system may also be installed on an inside part or clean side of a conveyor belt where space for installation of the conveyor system is limited by the location or another structure or structures. Such an application will support the conveyor belt and use the weight of the belt to apply tension to one or both tracking rollers to help center the conveyor belt. Specifically, when the belt alignment system is installed on the clean side of the conveyor belt, the tracking rollers push downward on the conveyor belt to apply tension to the belt and ensure sufficient contact between the surface of the conveyor belt and the rollers. It should be appreciated that the present conveyor alignment system may be used on the troughing flight/side or the return flight/side of the conveyor.

While a particular embodiment of the present conveyor alignment system has been shown and described, it will be appreciated by those skilled in the art that changes and modifications may be made thereto without departing from the invention in its broader aspects and as set forth in the following claims.

What is claimed is:

1. An alignment system for a conveyor having a conveyor belt trained over rollers on a conveyor frame, the system comprising:
    a support bracket including a center support;
    pivoting members each including a torque arm, said pivoting members being pivotally mounted to opposing ends of said support bracket;
    two tracking rollers independently mounted to said support bracket, each of said tracking rollers including a shaft with an inner end and an outer end, said outer ends of said shafts being coupled to said pivoting members and said inner ends being coupled to said center support such that pivoting movement of the pivoting members causes said tracking rollers to pivot relative to said center support; and
    a guide control bar having two ends and being pivotally connected at each said end to a corresponding torque arm connected to said corresponding pivoting member, said guide control bar including guide rollers positioned at both edges of the conveyor belt for lateral control of said belt.

2. The alignment system of claim 1, wherein at least one of said support bracket, said tracking rollers and said guide control bar form an angle of between 0 to 45 degrees relative to a horizontal axis.

3. The alignment system of claim 1, wherein at least one of said support bracket, said tracking rollers and said guide control bar form an angle of between 10 to 30 degrees relative to a horizontal axis.

4. The alignment system of claim 1, wherein each of said outer ends of said shafts are pivotally and non-rotatably attached to corresponding pivoting members by a rotating bushing mounted in a corresponding one of each of said pivoting members.

5. The alignment system of claim 4, wherein each said pivoting member includes a housing defining a bushing chamber, said rotating bushing includes a block rotatable about a vertical axis defined by pivot pins engaged in upper and lower walls of said housing.

6. The alignment system of claim 5, wherein said block is dimensioned to freely rotate within said bushing chamber.

7. The alignment system of claim 5, wherein said block includes a central bore provided with a bushing member.

8. The alignment system of claim 7, wherein said bushing member is configured for individually accommodating at least one of a roller shaft and a shaft adapter.

9. The alignment system of claim 5 wherein at least one of said pivot pins is long enough to project through said bushing member to engage a flat spot on a corresponding one of said outer shaft ends for preventing rotation of the outer shaft end in the bushing.

10. The alignment system of claim 1, wherein at least one of said inner shaft ends is coupled to a spherical bushing in said center support.

11. The alignment system of claim 1, wherein said pivoting member is generally L-shaped and including a housing defining a bushing chamber oriented normally to a torque arm.

12. The alignment system according to claim 1, wherein the support bracket is positioned on one of a working flight side or return flight side of the conveyor belt.

13. The alignment system according to claim 12, wherein when the support bracket is positioned on the return flight side of the conveyor belt, said belt may ride on one of the top and beneath said tracking rollers.

14. An alignment system for a conveyor having a conveyor belt trained over rollers on a conveyor frame, the system comprising:
   an adjustable support bracket including a center support, wherein a position of said support bracket is adjustable relative to the conveyor frame;
   pivoting members pivotally mounted to opposing ends of said support bracket;
   two tracking rollers independently mounted to said support bracket, each of said tracking rollers including a shaft coupled to one of said pivoting members and pivotally connected to said center support, each of said tracking rollers forming an angle relative to a horizontal line; and
   a guide control bar having two ends and being pivotally connected at each said end to one of said pivoting members, said guide control bar including guide rollers positioned at both edges of the conveyor belt for lateral control of said belt.

15. The alignment system of claim 14, wherein at least one of said support bracket, said tracking rollers and said guide control bar form an angle of between 0 to 45 degrees relative to a horizontal axis.

16. The alignment system of claim 14, wherein at least one of said support bracket, said tracking rollers and said guide control bar form an angle of between 10 to 30 degrees relative to a horizontal axis.

17. The alignment system of claim 1, wherein each of said shafts of said tracking rollers is coupled to a spherical bushing in said center support.

\* \* \* \* \*